Nov. 26, 1963 J. A. PORTER ETAL 3,112,261
APPARATUS AND METHOD FOR PROMOTING BIOLOGICAL
OXIDATION OF ORGANIC MATERIAL
Filed April 13, 1961 2 Sheets-Sheet 1
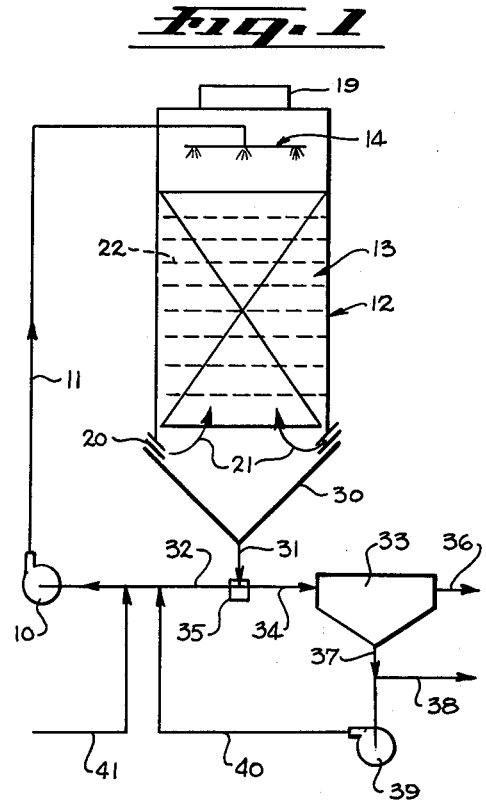
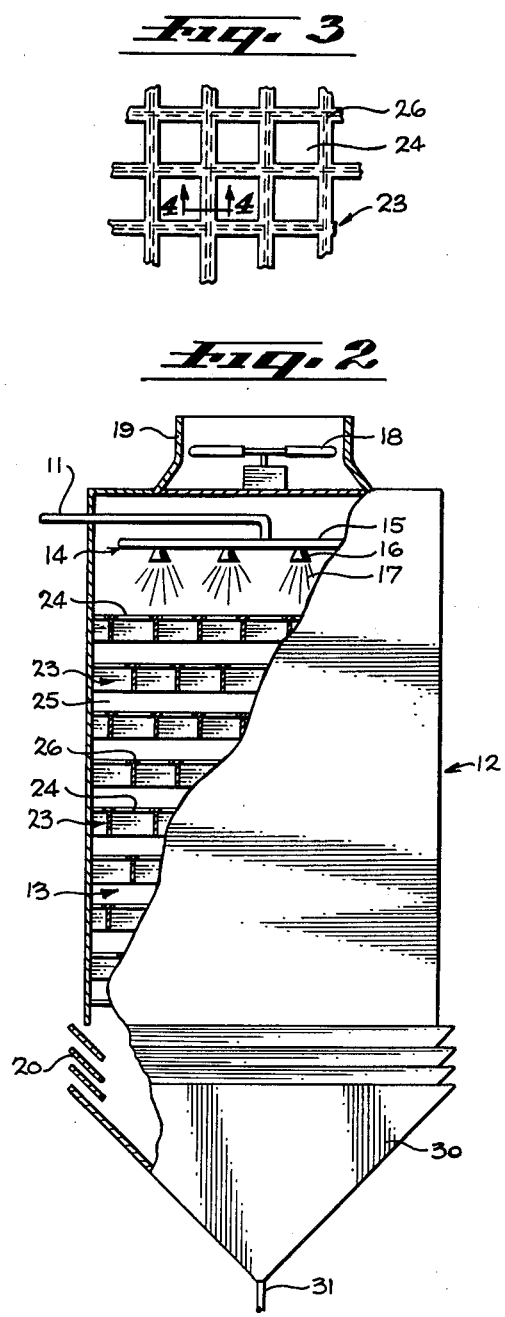
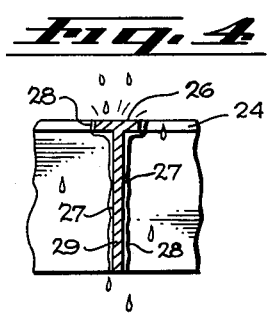
INVENTORS
JOE A. PORTER
ARTHUR L. KOHL
BY White and Haefliger
ATTORNEYS

INVENTORS
JOE A. PORTER
ARTHUR L. KOHL

ATTORNEYS

United States Patent Office 3,112,261
Patented Nov. 26, 1963

3,112,261
APPARATUS AND METHOD FOR PROMOTING BIOLOGICAL OXIDATION OF ORGANIC MATERIAL
Joe A. Porter, Whittier, and Arthur L. Kohl, Woodland Hills, Calif., assignors to The Fluor Corporation, Ltd., Los Angeles, Calif., a corporation of California
Filed Apr. 13, 1961, Ser. No. 102,733
7 Claims. (Cl. 210—17)

This invention relates generally to biological oxidation of organic materials, and more particularly concerns a novel method and apparatus for promoting biological oxidation of organic material carried in feed liquid.

At the present time, so-called trickling filters are employed for the biological oxidation of waste materials, these filters consisting typically of large concrete tanks containing rock fill to which liquid waste is applied. Conditions amenable to biological growth on the rock fill are maintained in order that the living biological slime may absorb the organic material present in the water and utilize it as food to sustain biological life. A primary function of the trickling filter is to maintain a supply of dissolved oxygen in the water, as required by the biological growth. Other end products include water, carbon dioxide and nitrates.

While the conventional trickling filter serves the purpose of waste disposal, there are many problems attendant to its operation. For example, during the summer, the apparatus is subject to plugging, ponding, flooding, and the presence of filter flies. In winter, freezing and lowered biological activity present problems of considerable magnitude.

The present invention has for its major object to provide solutions to the above mentioned problems through the provision of a novel apparatus and method for promoting biological oxidation of organic material carried in feed liquid. As broadly conceived, the method includes the step of distributing feed liquid containing the organic material so that it will travel in particles within an air treatment zone and through a series succession of subzones therein, only some of the liquid particles being intercepted at each of the subzones so that the intercepted particles splash divide into subparticles having increased surface exposure to air in the treating zone. The latter is maintained essentially open as contrasted with the conventional completely rock filled trickling filter. Furthermore, intercepted particles are filmed at each of the subzones and in relatively slowly moving films for increasing the time duration of air contact with the organic material, and the liquid traveling between the subzones is kept free for contact by air. As a result, it is found that the method attains very high removal efficiencies, as shown by comparisons of the organic material content of the entering and leaving liquid streams.

With reference to the apparatus contemplated for promoting biological oxidation of organic material, it includes a chamber containing an air treatment zone and a series succession of subzones, together with means for distributing the feed liquid to travel in particles within the treatment zone and through the previously mentioned subzones. In addition, other means are provided for suddenly intercepting only some of the liquid particles at each of the subzones so that intercepted particles splash divide into subparticles having increased surface exposure for contact with air in the treating zone. The mentioned other means have surfaces acting to film the intercepted particles at each of the subzones and in relatively slowly moving films for increasing the time duration of air contact with the organic material in the treating zone, the subzones being spaced apart so that the liquid traveling therebetween is free for contact by air. The results obtained through the use of such apparatus have been mentioned in connection with the brief discussion of the method contemplated by the invention, and will be more completely discussed hereafter.

Additional structural features of the invention include the provision of a collector basin under the treating zone receiving the liquid effluent therefrom, a settling basin receiving liquid drawn from the collector basin and feed means including a pump introducing to the treating zone liquid drawn from the collector basin, or from the settling basin, as desired.

These and other objects and advantages of the invention, as well as the details of an illustrative embodiment, will be more fully understood from the following detailed description of the drawings, in which:

FIG. 1 is a flow diagram illustrating the full treatment and distribution of the organic material carried in the feed liquid;

FIG. 2 is a side elevation partly broken away showing the construction of the treating chamber;

FIG. 3 is an enlarged plan view showing the typical alignment of the surfaces adapted to splash and film the particles of feed liquid within subzones in the treating chamber;

FIG. 4 is an enlarged section taken on line 4—4 of FIG. 3, showing the typical cross sectional configuration of the packing grid and its operation to splash and film the feed liquid particles;

Figure 4A:
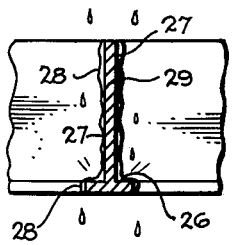
FIG. 4a is a view like FIG. 4 showing a modification of the grid arrangement in use.

Referring first to FIG. 1, 10 indicates a pump delivering feed liquid through a conduit 11 to a tower or chamber 12 containing an air treatment zone generally indicated at 13. The feed liquid typically comprises water containing organic material such as phenol, cyanide, waste materials such as those from paper pulp manufacture, food processing, refinery and coke oven plants and sanitary disposal of sewage, or other typically toxic contaminants, it being the function of the method and apparatus to promote biological oxidation of the organic material carried in the feed liquid. Such pulp manufacture wastes typically include sulfur compounds and other organic compounds known to those in the pulp and paper processing art.

The latter is suitably distributed in particle form within the upper interior of the chamber 13 as by the distributor indicated at 14, which typically comprises a header 15 receiving liquid from the conduit 11 and nozzles 16 communicating with the header and spraying the liquid downwardly within the chamber 13 as best shown in FIG. 3, the sprayed liquid being indicated at 17.

Oxygen contact with the feed liquid particles is produced by upward circulation of air within the chamber 13, such circulation typically, but not necessarily, being induced by a motor driven fan 18 operating in a stack 19 at the top of the chamber 11. Air is thus caused to be drawn through louvered lower side inlet openings 20 as shown by the arrows 21 in FIG. 1, the air then circulating upwardly through the treating zone 13 to discharge through the stack 19.

Situated at vertically spaced, horizontally extending subzones generally indicated at 22 in FIG. 1, are means operating suddenly to intercept only some of the liquid particles at each of the subzones so that the intercepted particles splash divide into subparticles having increased surface exposure and contact with air in the treating zone 13. Such other means typically, but not necessarily, comprise grid decks generally indicated at 23 in FIG. 2, these extending horizontally across the chamber 12, and forming vertically open passages 24 through which the air is adapted freely to flow upwardly through the chamber 13 in intimate contact with the feed liquid particles dropping downwardly through the passages 24 formed by the grid decking. Similarly, the grid decking zones are vertically separated as at 25 to provide for open treating zone extent within which the feed liquid particles may drop for oxidation contact with the rising air stream.

The grid decking furthermore acts to intercept those of the liquid feed particles falling downwardly against the surfaces as shown at 26 in FIGS. 3, 4 and 4a. Such surfaces are typically horizontal so as to effect splash division of the impinging feed liquid particles thereby to further divide the particles into subparticles having increased surface exposure for contact with the air in the treating zones. In addition, surfaces 26, together with the side surfaces 27 of the grid decking, act to film the intercepted particles at each of the subzones and in relatively slowly moving films indicated at 28 for increasing the time duration of air contact with the organic material in the treating zone. FIG. 4 shows the grid decking appearing in horizontal cross section to have a T-shaped configuration. Alternately, this cross section can be used effectively in an upside down configuration as shown in FIG. 4a. Typical height of the decking is around 2 inches and typical thickness of the vertical extent 29 of the decking is around 1/10 inch. The horizontal width of the top surface strips 26 of the decking is around 1/4 inch.

Referring back to FIG. 1, a collection basin 30 is shown underlying the chamber 12 in order to receive the liquid effluent from the treating zone 13. Liquid discharging from the collection basin 30, as shown by the line 31, may either be recycled at 32 to the pump 10 or may be delivered to a settling basin 33 through a line 34. Oxidation of organic material delivered to the basin 33 continues therein by virtue of oxygen dissolved in the liquid in the tower 12, thereby promoting increased efficiency. A valve 35 is shown for dividing the stream between the conduits 32 and 34. Fully treated liquid may be drawn from the settling basin as indicated by the conduit 36, and sludge drawn from the settling basin as indicated at 37 may either be discharged at 38 or pumped at 39 for return through a conduit 40 to the pump 10 delivering to the treating zone 13. Finally, entering feed liquid containing contaminants is shown being delivered through a conduit 41 to the pump 10 for delivery to the treatment zone in the tower. The feed may be mixed with sludge recycled through line 40 or with a portion of the liquid drawn from the collecting basin and delivered at 32, prior to delivery to the pump 10. Also, any one of these feeds and recycles may be operated alone or in conjunction with one or more of the others all for the purpose of serving to promote optimum contaminant removal efficiencies from the liquid treated.

Laboratory tests indicate that the rate of removal of phenol from a pure phenol solution is essentially the same as the rate of removal of phenolic compounds from coke oven waste water. The tests on which this is based were conducted utilizing a column containing plastic grid decking and seeded with a water extract from manure. Acclimation of the biological culture to phenol waste was accomplished by periodically increasing the amount of these materials added to the filter basin. Proper additions of nitrogen and phosphorous were made to maintain a carbon-nitrogen-phosphorous balance of 20–2–1.

At the end of approximately one month the filter was charged with 10 liters of coke oven waste water, samples were withdrawn periodically and analyzed for phenol content. At the end of 42 hours the run was considered complete. The experiment was then repeated with 10 liters of phenol and cyanide in distilled water. Tests also show that the rate of removal of cyanide from the same solution and from the corresponding coke oven waste solution, is essentially the same as indicated.

The above laboratory tests show that the oxidation rate for the phenol and cyanide compounds in coke oven waste water is essentially the same as for pure compounds in distilled water. An analysis of the content of the coke oven waste water is shown in Table I as follows:

TABLE I

*Analysis of Coke Oven Waste Water*

|  | P.p.m. |
| --- | --- |
| Phenol | 107 |
| Cyanide | 87 |
| Total nitrogen | 210 |
| Sulfide sulfur | 33 |
| Chlorides | 388 |
| Oil | 22 |
| BOD | 380 |

As a second example, a pilot plant filtering apparatus of the present invention was operated utilizing a synthetic phenol-cyanide waste solution. A phenol-cyanide ratio of 4:3 was used for the feed solution, and hydraulic loading of 3 g.p.m./sq. ft. was established for initial operation. This filter was seeded with a water extract of "Vigoro" and diammonium phosphate were added as required to maintain conditions amenable to biological growth. The phenol-cyanide solution was pumped to the filter at a constant rate by a chemical feeder pump. The feed rate was usually increased daily with the amount of increase based on phenol-cyanide removal of approximately 90%.

This liquid feed rate increase amounted to approximately 50 cc./minute or 58 gm. of phenol and 36 gm. of cyanide per day. These values are equivalent to 1.4 lbs. phenol and .9 lb. cyanide per 1000 cu. ft. packing per day. Phenol as referred to earlier is pure phenol, while cyanide refers to the cyanide ion ($CN^-$). The filter capacity was found to reach a maximum in less than three weeks, and maximum contaminant removals obtained were 25 lbs. phenol per 1000 cu. ft. of packing per day and 17 lbs. cyanide per cu. ft. packing per day. Stable operation of the system generally showed phenol removals of 98% or greater with cyanide removals of better than 85%. The temperature of the solution in the treating zone remained at about 90° F., and the pH of the solution remained between 8 and 9.

The foregoing results were obtained from runs made using a concentrated feed solution. In order to simulate field conditions, with relatively dilute feed, the entering concentrations of phenol and cyanide were maintained at approximately 100 parts per million and 75 parts per million for cyanide. Data obtained from the dilute feed runs and the earlier runs using concentrated feed solutions are shown in Table II which follows:

TABLE II

*Trickling Filter Operation With Synthetic Phenol-Cyanide Feed*

| Average Application Rate, #/1000 cu. ft. Packing/Day | | Average Removal Rate #/1000 cu. ft. Packing/Day | | Average Percent Removal | | System Residence Time, Hours | Hydraulic Loading, g.p.m./sq. ft. |
|---|---|---|---|---|---|---|---|
| Phenol | Cyanide | Phenol | Cyanide | Phenol | Cyanide | | |
| 19.3 | 16.0 | 18.1 | 14.9 | 93.5 | 94.5 | 11.6 | 4 |
| 19.6 | 15.7 | 19.5 | 14.8 | 99.5 | 94.5 | 11.3 | 4 |
| 20.8 | 16.7 | 18.9 | 15.7 | 99.4 | 94.5 | 10.7 | 3 |
| 23.7 | 19.0 | 23.6 | 17.8 | 99.7 | 93.6 | 9.4 | 3 |
| 21.4 | 15.2 | 21.4 | 13.6 | 99.9 | 88.1 | 2.8 | 3 |
| 23.8 | 18.6 | 22.6 | 17.2 | 94.7 | 90.3 | 2.2 | 3 |
| 29.5 | 22.3 | 26.6 | 17.4 | 90.3 | 78.6 | 1.6 | 3 |
| 30.0 | 23.2 | 28.2 | 18.4 | 93.8 | 79.4 | 1.9 | 3 |
| 27.5 | 22.0 | 22.9 | 20.2 | 83.1 | 91.0 | 2.2 | 4 |
| 28.9 | 21.7 | 28.2 | 17.8 | 97.8 | 81.9 | 1.9 | 4 |
| 39.7 | 31.7 | 29.0 | 25.0 | 72.9 | 78.8 | 1.4 | 4 |

These data are generally averages of the data when steady state operation of the pilot plant has been achieved.

Figure 5:
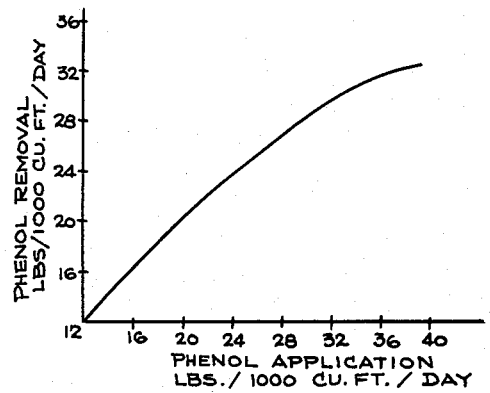
FIG. 5 is a graph comparing different rates of phenol application to the filter of the present invention, with corresponding phenol removal effected by the filter.
Figure 7:
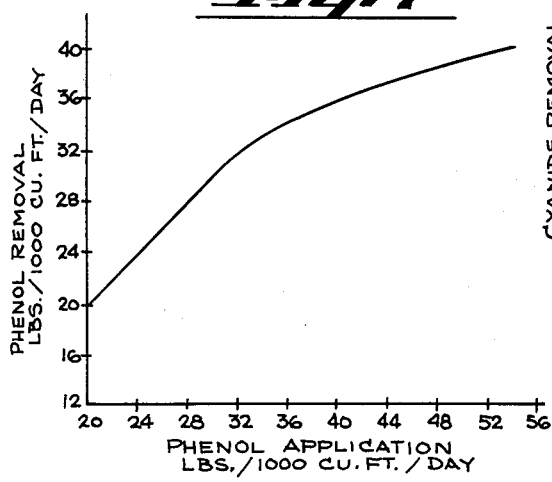
FIG. 7 is a graph comparing phenol application to a filter of the present invention, with phenol removal.
Figure 6:
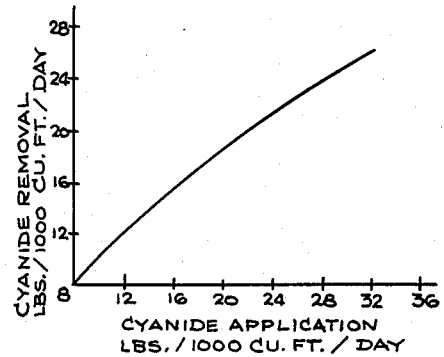
FIG. 6 is a graph comparing different rates of cyanide application to the filter of the present invention, with corresponding cyanide removal as effected by the filter.

FIGS. 5 and 6 are plots of the data taken from Table II, and provide a satisfactory means for correlation. An interesting discovery indicated by the plots is the correlation of the concentrated feed runs with the dilute feed runs in terms of phenol removal achieved in response to different rates of phenol application. The solution utilized for these runs was a phenol-cyanide synthetic waste solution, wherein the phenol-cyanide ratio was 4:3. The foregoing indicates the tower capacity to be independent of feed concentration. FIG. 6 is like FIG. 5 but indicates cyanide removal from the solutions for different rates of cyanide application.

Runs were also made to evaluate the effects of sulfide ions in filter operations. It was found that the apparatus was extremely effective to remove sulfide from waste waters in which the sulfide concentration was less than 50 parts per million.

Finally, a series of runs were made to establish capacity of the apparatus for phenol waste alone. These runs indicated that removal of at least 99% of the phenol was achieved for phenol application rates of 7 to 32 pounds per 1000 cubic feet per day. Greater phenol application rates resulted in a reduction of phenol removal to 90% for application rates of 40 pounds per 1000 cubic feet per day.

We claim:

1. The method of promoting biological oxidation of organic waste material carried in feed liquid, that includes distributing said feed liquid to travel in particles within an air zone contained within a chamber and through a series succession of subzones therein, suddenly intercepting only some of the liquid particles on open plastic grid work facing the approaching particles at each of said subzones so that intercepted particles splash divide into subparticles having increased surface exposure for contact with air in said zone, filming intercepted particles on grid work surfaces generally parallel to the direction of falling liquid travel and at each of said subzones and in relatively slowly moving films for increasing the time duration of air contact with said organic material, draining the particles in free falling state after termination of filming travel thereof at each of said subzones, the liquid traveling between said subzones being free for contact by air, seeding the feed liquid with bacteria to build up biological culture on the plastic gridwork surfaces, inducing displacement of air to flow upwardly and openly at a controlled rate sequentially through said subzones from an air inlet region in the lower portion of said chamber, thereby to controllably dissolve oxygen in the downward traveling particles at and between said subzones, said liquid splashing and filming and said upward air flow acting to promote near maximum solution of oxygen in the liquid for distribution and supply to the culture forming on said surfaces in open gridwork pattern, increasing the input of waste material to said zone over predetermined time intervals to acclimate the culture on said plastice surfaces to said waste, collecting the liquid effluent from said treating zone to promote continued oxidation of organic material therein outside said zone, and introducing at least some of the effluent into said feed stream.

2. The method of claim 1 including separating sludgey organic material from certain of said effluent, and introducing at least some of the sludgey organic material into the feed stream.

3. The method of claim 2 in which said material includes phenol, and said liquid comprises water.

4. The method of claim 2 in which said material includes cyanide, and said liquid comprises water.

5. The method of claim 2 in which said material comprises pulp manufacture waste.

6. Apparatus for promoting biological oxidation, comprising a chamber containing an air zone and a vertical series succession of subzones, a source of feed liquid containing organic waste material, distributor means communicating with said source for distributing the bulk of said feed liquid to fall in particles within said air zone and through said subzones, open plastic gridwork having upwardly presented surfaces for suddenly intercepting only some of the liquid particles at each of the subzones so that intercepted particles splash divide into subparticles having increased surface exposure for contact with air in said zone, said gridwork having gridwork surfaces generally parallel to the direction of liquid fall and acting to film particles at each of the subzones in relatively slowly draining films for increasing the time duration of air contact with organic material in said zone, said subzones being vertically spaced apart so that liquid falling between the subzones is free for contact with air, means including a fan for inducing displacement of air to flow upwardly at a controlled rate sequentially through said subzones from an air inlet region in the lower portion of said chamber thereby to controllably dissolve oxygen in the downward traveling particles at and between said subzones, said liquid splashing and filming and said upward air flow acting to promote near maximum solution of oxygen in the liquid for distribution and supply to the culture on said surfaces in open gridwork pattern, collector means receiving the liquid effluent from said treating zone, means for returning to said distributor means a portion of said effluent received in the collector means and for discharging another portion of said effluent, said means for discharging another portion of said effluent including a settling basin receiving effluent drawn from said collector basin, and including conduit means communicating with said settling basin and through which sludgey organic material withdrawn from said settling basin is returned for distribution by said distributor means.

7. The invention as defined in claim 6 in which said gridwork has T-section configuration in vertical planes and contains vertical openings through which air passes upwardly in aerating counterflow relation to said falling liquid particles, said chamber having air inlet and outlet passages and including means for displacing air through said treating zone and said passages, and said source containing sewage.

References Cited in the file of this patent

UNITED STATES PATENTS

| | | |
|---|---|---|
| 963,448 | Linden | July 5, 1910 |
| 2,008,507 | Laughlin | July 16, 1935 |
| 2,022,329 | Tsuda | Nov. 26, 1935 |
| 2,178,818 | Earp-Thomas | Nov. 7, 1939 |
| 2,459,464 | Smith | Jan. 18, 1949 |
| 2,665,249 | Zimmermann | Jan. 5, 1954 |
| 2,793,017 | Lake | May 21, 1957 |
| 2,825,210 | Carr | Mar. 4, 1958 |
| 2,858,119 | Wright et al. | Oct. 28, 1958 |
| 2,865,617 | Dickens et al. | Dec. 23, 1958 |
| 2,882,996 | Lanier et al. | Apr. 21, 1959 |
| 2,992,986 | Ingram | July 18, 1961 |
| 3,039,749 | Kohl et al. | June 19, 1962 |

FOREIGN PATENTS

| | | |
|---|---|---|
| 20,353 | Great Britain | of 1900 |
| 13,832 | Great Britain | of 1901 |
| 799,826 | Great Britain | Aug. 13, 1958 |